US005430482A

United States Patent [19]

Kim

[11] Patent Number: 5,430,482

[45] Date of Patent: Jul. 4, 1995

[54] ELECTRONIC VIEW FINDER HAVING A COLOR VECTOR DISPLAY

[75] Inventor: Kee-yong Kim, Kunpo, Rep. of Korea

[73] Assignee: Samsung Electronics Co., Ltd., Kyungki, Rep. of Korea

[21] Appl. No.: 278,866

[22] Filed: Jul. 22, 1994

[30] Foreign Application Priority Data

Aug. 18, 1993 [KR] Rep. of Korea .................... 93-15943

[51] Int. Cl.[6] ......................... H04N 5/30; H04N 5/225

[52] U.S. Cl. .................................... 348/333; 348/223; 348/259

[58] Field of Search ............... 348/353, 341, 222, 223, 348/569, 186, 65, 589, 259; H04N 9/64, 5/30, 5/225; 354/214

[56] References Cited

U.S. PATENT DOCUMENTS 5,267,026 11/1993 Kawahara et al. ................. 348/223

5,295,204 3/1994 Parulski ............................... 348/223

*Primary Examiner*—Michael T. Razavi

*Assistant Examiner*—Tuan V. Ho

*Attorney, Agent, or Firm*—Sughrue, Mion, Zinn, Macpeak & Seas

[57] ABSTRACT

In a video signal camera having a signal processor for generating a luminance signal Y and a chrominance signal components R-Y and B-Y, an electronic view finder having a color vector display for displaying a vector corresponding to white balance on a monochromatic electronic view finder includes an amplifier for amplifying the peak values $R\text{-}Y_{pp}$ and $B\text{-}Y_{pp}$ of the chrominance signal components, a clamping circuit for changing a direct current (DC) value of the chrominance signal components generated by the amplifier, an analog-to-digital converter (ADC) for converting the chrominance signal components output from the clamping circuit and the luminance signal into respective digital data values, an integrator for summing the digital data values provided by the ADC for each of a predetermined number of blocks corresponding to a screen, a controller for extracting a white area representing the integrated value of each block computed by the integrator and obtaining a white vector value for the extracted white area, and a display receiving the white vector value for displaying a respective white vector on the screen. Accordingly, since a white color vector is displayed in the OSD within a monochromatic electronic view finder, a white balance can be detected while employing the monochromatic electronic view finder.

14 Claims, 3 Drawing Sheets

LENS
IMAGE PICKUP TUBE
TIMING GENERATOR
AUTOMATIC GAIN CONTROLLER
IRIS-y
SSG
CHROMATICITY SYNCHRONIZING MATRIX CIRCUIT
1H DELAY
1H DELAY
Y
R-Y
B-Y
MIXER
VIDEO OUT
AMPLIFIER
CLAMPING CIRCUIT
A/D CONVERTER
SCREEN DIVIDING INTEGRATOR
MICRO-COMPUTER
OSD CHARACTER GENERATOR
ELECTRONIC VIEW FINDER
VIDEO IN
1
2
3
4
5a
5b
10
11
12
13
20
21
22
23
24
25
26
27
28
29

| 1 | 2 | 3 | 4 | 5 | 6 | 7 | 8 |
|---|---|---|---|---|---|---|---|
| 9 | | | | | | | |
| | | | | | | | |
| | | | | | | | |
| | | | | | | | |
| | | | | | | | |
| | | | | | | | |
| | | | | | | 63 | 64 |

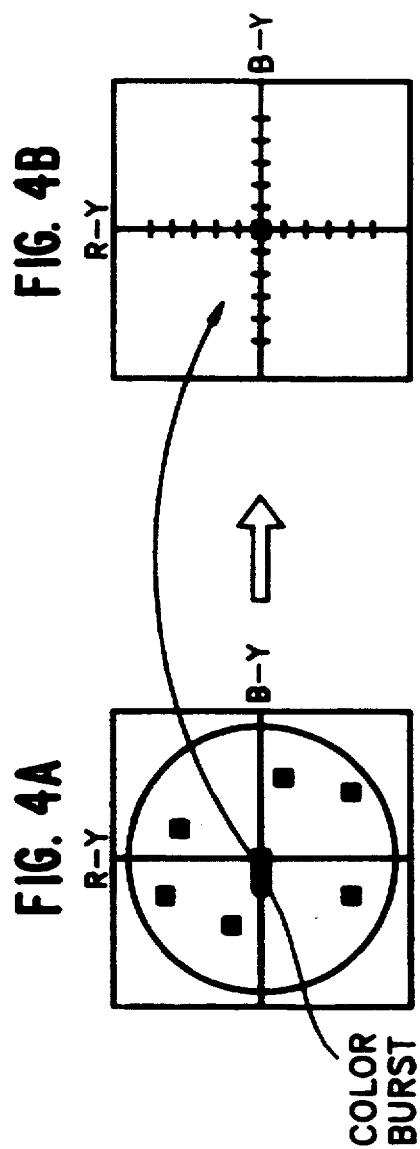
FIG. 4A
R-Y
B-Y
COLOR BURST
FIG. 4B
R-Y
B-Y
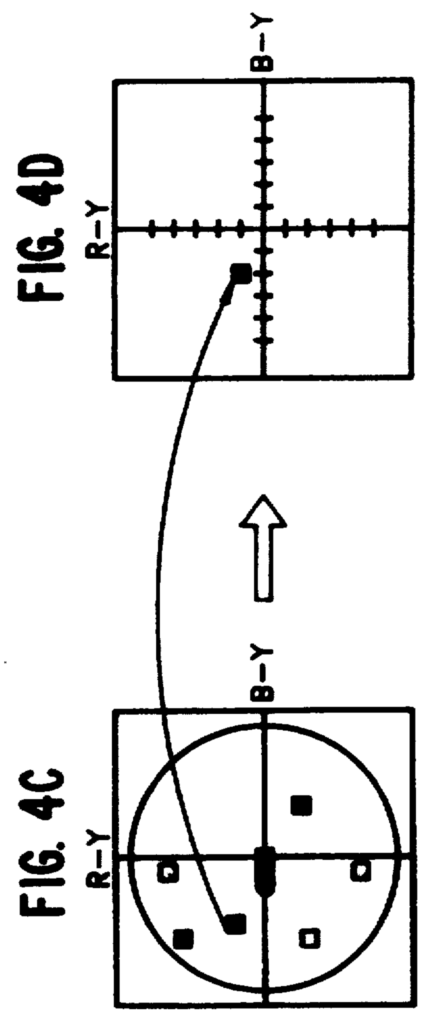
FIG. 4C
R-Y
B-Y
FIG. 4D
R-Y
B-Y

ELECTRONIC VIEW FINDER HAVING A COLOR VECTOR DISPLAY

BACKGROUND OF THE INVENTION

1. Field of the Invention

The present invention relates to an electronic view finder for focusing on an object and determining a framed view of the object in a video camera or a camcorder, and more particularly, to an electronic view finder having a color vector display for displaying a white color vector on a monochromatic electronic view finder which cannot differentiate colors.

Korean Utility Model Application No. 93-15943 is incorporated herein by reference for all purposes.

2. Discussion of Related Art

View finders for devices such as camcorders fall into two categories; electronic view finders and optical view finders. In an electronic view finder, a small television monitor is incorporated into the camera and an image appears on the monitor based on an image signal output by the camera. In an optical view finder, an image is developed by refracting part of the incident light from the object from a photographing lens through a semitransparent prism.

In a video camera or a camcorder, a cleaner image is provided by a monochromatic, as opposed to a color electronic view finder, because the former has a better resolution than the latter, is free of color noise, and thereby forms a cleaner image. However, since a monochromatic electronic view finder cannot differentiate colors, it cannot detect when the white balance is erroneously set or display an indication of an improperly set white balance. It will be noted that white balance is a differentiating basis for color signals. Also, although white balance can be set for automatic adjustment based on a specific illumination, automatic color adjustment across a broad range of light conditions cannot be precisely performed.

SUMMARY OF THE INVENTION

The principal object of the present invention is to provide a monochromatic electronic view finder having a vector scope in order to detect a white balance state without a color monitor.

An object of the present invention is to provide a monochromatic electronic view finder having a vector scope which is selectively displayed by an on-screen display (OSD) generator coupled to the monochromatic electronic view finder. According to one aspect of the present invention, the electronic view finder can be used to detect a current white balance state of an input image signal without a color monitor.

Another object of the present invention is to provide an electronic view finder having a white balance vector on-screen display (OSD) circuit, coupled to a monochromatic electronic view finder, forming of a vector scope so as to display a current white balance state without a color monitor.

Still another object according to the present invention is to provide an integral vector scope in a monochromatic electronic view finder which can be provided at low cost.

These and other objects, features and advantages according to the present invention are provided by a color vector display apparatus for a video signal camera having a signal processor for generating a luminance signal (Y) and a chrominance signal (R-Y and B-Y) and an electronic view finder. The color vector display apparatus advantageously includes:

- amplifying means for amplifying peak values ($R\text{-}Y_{pp}$ and $B\text{-}Y_{pp}$) of chrominance signal components to predetermined amplitude levels;
- clamping means receiving amplified signal components for changing a direct current (DC) value of the chrominance signal components output;
- analog-to-digital converting means for converting the chrominance signal components output from the clamping means and a luminance signal into respective digital data values;
- integrating means for summing the digital data values output from the converting means according to area, by dividing a screen into a predetermined number of areas;
- controlling means for extracting a white area in accordance with the integrated value of each area computed by the integrating means and generating a white vector value for the extracted white area; and
- display means for displaying the white vector on the screen in accordance with the white vector value output by the controlling means.

These and other objects, features and advantages of the invention are disclosed in or apparent from the following description of preferred embodiments.

BRIEF DESCRIPTION OF THE DRAWINGS

The above objects and advantages of the present invention will become more apparent from the following description of a preferred embodiment thereof with reference to the attached drawings in which:

FIGS. 4A, 4B, 4C and 4D illustrate actual and on-screen display (OSD) displayed forms of a vector scope, where FIGS. 4A and 4B represent actual and displayed forms of a vector scope output during the imaging a color bar, respectively, while FIGS. 4C and 4D correspond to actual and displayed forms of the vector scope display illustrating improper white balance, respectively, according to the present invention.

DETAILED DESCRIPTION OF THE PREFERRED EMBODIMENT

Figure 1:
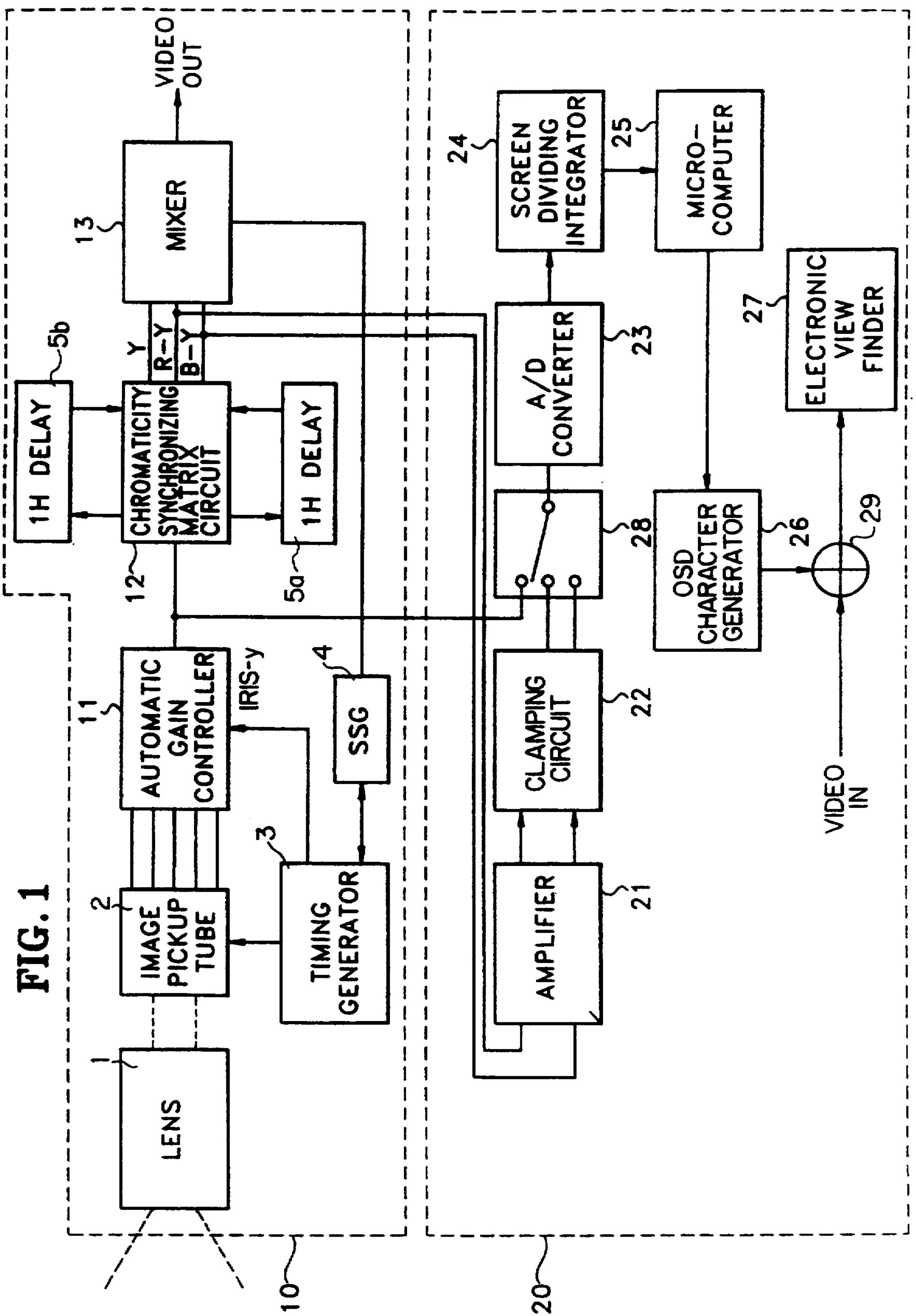
FIG. 1 is a high level block diagram of a video camera having a color vector display according to the present invention.

FIG. 1 is a high level block diagram representing essential components of an electronic camera, e.g., a camcorder, which, in addition to a conventional video camera signal processor 10 includes a color vector display 20 according to the present invention.

The conventional video camera signal processor 10 will be described only to the extent necessary to gain an understanding of the novel features of the invention. An iris luminance signal iris-Y and chrominance signal represented by components R-Y and B-Y generated in the video camera signal processor 10 are input to the color vector display 20. It will be noted that the video camera signal processor 10 generates the iris luminance signal iris-Y in an automatic gain controller 11 and generates the chrominance signal in a chromaticity synchronizing matrix circuit 12. In an exemplary case, the signal processor 10 may include a lens 1, an image pickup tube 2, a timing generator 3 for driving the tube 2 in response to sync signals provided by sync signal generator circuit 4. Matrix circuit 12 may be coupled to 1 H line delay elements 5*a*, 5*b* in a manner well known to those of ordinary skill in the art. The output signals of matrix 12 are received and combined in mixer 13 to produce an output composite video signal VIDEO OUT.

The color vector display 20 advantageously includes an amplifier 21, a clamp circuit 22, a selection switch 28, an analog-to-digital converter (ADC) 23, screen dividing integrator 24, a microcomputer 25, a screen character generator 26, a combiner 29 and an electronic view finder 27. The operation of each of these components will be described in greater detail below.

The amplifier 21 amplifies the peak values $R\text{-}Y_{pp}$ and $B\text{-}Y_{pp}$ of the input chrominance signal components to predetermined amplitude levels and applies the amplified chrominance signal components to clamping circuit 22. Preferably, amplifier 21 amplifies the chrominance signal components to about 70% of the way between upper and lower limit values produced by the ADC 23 during the imaging a color bar chart.

The clamping circuit 22 changes the DC value so that the black-level DC value of the chrominance signal components output from the amplifier 21 becomes the mean value of the upper and lower limit values of the ADC 23.

The selection switch 28 alternately selects either the chrominance signal components output from the clamping circuit 22 or the iris luminance signal iris-Y output from the automatic gain controller 11, during a period of time representing one field period, and outputs the selected signal to ADC 23.

Figures 2, 3:
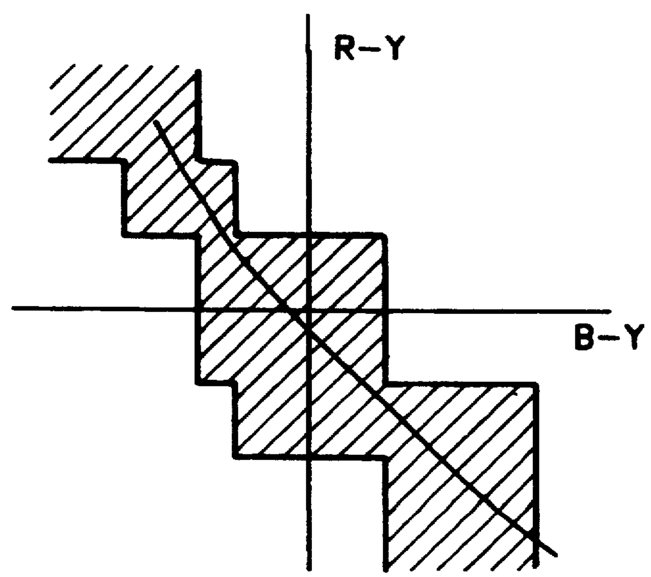
FIG. 2 is an illustration which is useful in understanding screen division according to a preferred embodiment of the present invention.
FIG. 3 is a diagram showing white color temperature loci in chrominance signal coordinates.

Advantageously, ADC 23 converts all of the input analog signals into respective digital data values, which are then input to the screen dividing integrator 24. The screen dividing integrator 24 sums the digital data values output from the ADC 23 by area, e.g., by dividing a screen into a predetermined number of blocks. FIG. 2 shows an exemplary screen which has been divided into 64 blocks.

It will be appreciated that if the clock frequency of the six-bit ADC 23 is 4/3 times a subcarrier frequency (fsc), the output data of the ADC 23 for one block including 29 data values horizontally and 30 data values vertically will have a maximum integrated value for one area of $2^6 \times 29 \times 30$, which is smaller than $2^{16}$. Therefore, the internal address of the ADC 23 can be sixteen bits.

The microcomputer 25 determines which area is an integrated white area according to the integrated values of the respective blocks, computed by means of the screen dividing integrator 24, extracts the white area and obtains the white vector value for the extracted white area.

The on-screen display (OSD) character generator 26 produces a vector scope representation including a white vector depicted by as a predetermined character, e.g.,"※", according to the white vector value output by microcomputer 25. The output of character generator 26 is provided to monochromatic electric view finder 27 via combiner 29, which advantageously also receives an input video signal VIDEO IN corresponding to the signal VIDEO OUT.

FIG. 3 shows white color temperature loci L in terms of chrominance signal coordinates. Here, the white area selected by the microcomputer 25 is an area of high luminance and low saturation. However, since the white color temperature loci L falls within the oblique-lined portion shown in FIG. 3, the microcomputer 25 selects all the data values within the white area.

It should be noted that approximately one fourth of the upper portion of the screen, that area which is often occupied by the sky in outdoor photography, is excluded from the areas among which a white area is determined. Furthermore, since white characteristics are high in luminance, the luminance level for each area is detected according to the overall integrated mean values of the luminance signal and the chrominance signal value is weighted according to the detected luminance level. Therefore, when the luminance value of a certain area is smaller than a predetermined value, e.g., a threshold value, that area is excluded from the white area.

The microcomputer 25 selects the white area by comparing the area values of the white portion selected as described above with the data values of the respective chrominance signals and obtains the mean value of the white areas by averaging the values for each of the selected areas.

The character generator 26 designates vertical coordinates according to the area values of chrominance signal component R-Y and horizontal coordinates according to the area values of chrominance signal component B-Y and displays white vector values by a predetermined character, thereby vectorially displaying the white color sensation using the OSD.

In an exemplary case, the white value is displayed in the OSD by an $11 \times 11$ data matrix. Preferably, the zone in which the chrominance signal belongs is determined by dividing the black values into upper and lower five coordinate zones on the basis of black values. In order to display the white vector in more detail, the farther the data values by the coordinate zone of the OSD are deviated from a central zone to an outer zone, the wider the interval of the data values becomes.

FIG. 4A shows the vector scope display during the imaging a color bar and FIG. 4B illustrates the displayed vector scope representation using the on-screen display (OSD) according to the present invention. It will be appreciated that FIGS. 4A and 4B show the vector scope and the displayed form of the OSD for the exemplary case where the white balance is being properly maintained. In contrast, FIG. 4C shows the vector scope display and FIG. 4D shows the corresponding displayed form of the OSD for the exemplary case where the white balance is not properly adjusted or maintained.

It will be appreciated that the conventional OSD is divided into 24 areas horizontally and 12 areas vertically. In forming a representative vector scope display, one upper line can advantageously be excluded vertically while thirteen lines, six to the left and seven to the right, can be excluded horizontally to thereby display the white vector in the central area of the OSD.

As described above, according to the present invention, by displaying a white color vector in the OSD of a monochromatic electronic view finder, the white balance can be detected and displayed using the monochromatic electronic view finder and, thus, the photographed color state can be detected.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a video signal camera having a signal processor for generating a luminance signal Y and chrominance signal components (R-Y) and (B-Y), an electronic view finder having a color vector display comprising:

amplifying means for amplifying the peak values ($R\text{-}Y_{pp}$) and ($B\text{-}Y_{pp}$) of said chrominance signal components to predetermined amplitude levels;

clamping means receiving amplified signal components for changing a direct current (DC) value of respective chrominance signal components;

converting means for converting clamped signal components output from said clamping means and said luminance signal into respective digital data values;

integrating means for receiving and summing the digital data values output from said converting means according to area, by dividing a screen into a predetermined number of blocks;

controlling means for extracting a white area in accordance with the integrated value of each block computed by said integrating means and obtaining a white vector value representing an extracted white area; and display means for displaying the white vector on the screen in accordance with the white vector value output from said controlling means.

2. The electronic view finder having a color vector display as claimed in claim 1, further comprising:

selection means operatively coupled between said clamping means and said converting means for alternately selecting one of said clamped signal components output from said clamping means and said luminance signal, during a period corresponding to one field, for output to said converting means.

3. The electronic view finder having a color vector display as claimed in claim 1, wherein said amplifying means amplifies the peak values ($R\text{-}Y_{pp}$ and $B\text{-}Y_{pp}$) of said chrominance signal components to about 70% of the way between upper and lower limit values generated by said converting means.

4. The electronic view finder having a color vector display as claimed in claim 1, wherein said clamping means further comprises means for changing a black-level direct current (DC) value of said amplified signal components output from said amplifying means into a mean value of said upper and said lower limit values of said converting means.

5. The electronic view finder having a color vector display as claimed in claim 1, wherein said controlling means excludes a predetermined zone corresponding to an upper portion of said screen from said blocks whereby said white area is determined.

6. The electronic view finder having a color vector display as claimed in claim 5, wherein said predetermined zone represents one fourth of said upper portion of said screen.

7. The electronic view finder having a color vector display as claimed in claim 1, wherein said controlling means detects luminance level of the respective blocks according to an overall integrated mean values for said luminance signal for weighting said digital signal values corresponding to said clamped signal components according to the detected luminance level and excludes said blocks whose respective luminance level is smaller than a predetermined luminance level from a white area.

8. The electronic view finder having a color vector display as claimed in claim 1, wherein said display means comprises an on-screen display generator operatively connected to a monochromatic electronic view finder.

9. A vector scope display apparatus for a monochromatic electronic view finder of a video camera having a signal processor for generating a luminance signal and a plurality of chrominance signal components, said apparatus comprising:

integrating means receiving digitized chrominance signal components and a digitized luminance signal as digital data values for summing said digital data values over a predetermined number of blocks collectively representing a portion of a video signal;

controlling means for extracting a white area in accordance with the integrated value of each of said blocks computed by said integrating means and generating a white vector value representing an extracted white area; and OSD character generating means operatively coupled to said electronic view finder for forming a display representing a white vector on a screen of said electronic view finder in accordance with the white vector value output from said controlling means.

10. The vector scope display apparatus as claimed in claim 9, further comprising:

amplifying means for amplifying respective peak values ($R\text{-}Y_{pp}$) and ($B\text{-}Y_{pp}$) of said chrominance signal components to predetermined amplitude levels;

clamping means receiving amplified signal components for changing a direct current (DC) value of respective chrominance signal components;

selection means for alternately selecting one of the chrominance signal output from said clamping means and said luminance signal, during in a period representing one field, for output to said converting means; and converting means for converting clamped signal components output from said clamping means and said luminance signal using said selection means into said digital data values.

11. The vector scope display apparatus as claimed in claim 10, wherein said clamped signal components generated by said clamping means are constrained according to a first and a second signal levels generated by said converting means.

12. The vector scope display apparatus as claimed in claim 9, wherein said controlling means excludes a predetermined zone of an upper portion of said screen from said blocks whereby a white area is determined.

13. The vector scope display apparatus as claimed in claim 12, wherein said predetermined zone corresponds to approximately one fourth of said upper portion of said screen.

14. The vector scope display apparatus as claimed in claim 9, wherein said controlling means detects luminance levels of respective blocks according to overall integrated mean values for said luminance signal, to thereby permit weighting of said digital signal values corresponding to said chrominance signal components according to a detected luminance level to thereby exclude respective blocks having an associated luminance level smaller than a predetermined luminance level from consideration in determining said white area.

* * * * *